United States Patent
Smith

(10) Patent No.: US 10,051,847 B1
(45) Date of Patent: Aug. 21, 2018

(54) FISHING LURES AND FISHING LURE PRODUCTION METHODS AND USES

(71) Applicant: Eric Smith, Waverly, WA (US)

(72) Inventor: Eric Smith, Waverly, WA (US)

(73) Assignee: Bert E. Smith, Cheney, WA (US)

( * ) Notice: Subject to any disclaimer, the term of this patent is extended or adjusted under 35 U.S.C. 154(b) by 478 days.

(21) Appl. No.: 14/737,055

(22) Filed: Jun. 11, 2015

Related U.S. Application Data

(60) Provisional application No. 62/010,955, filed on Jun. 11, 2014.

(51) Int. Cl.
  *A01K 69/00* (2006.01)
  *A01K 85/18* (2006.01)
  *A01K 99/00* (2006.01)

(52) U.S. Cl.
  CPC .............. *A01K 85/18* (2013.01); *A01K 99/00* (2013.01)

(58) Field of Classification Search
  CPC .................................. A01K 85/00; A01K 99/00
  USPC ............................................................. 43/4.5
  See application file for complete search history.

(56) References Cited

U.S. PATENT DOCUMENTS

| | | | |
|---|---|---|---|
| 2,149,054 A | 2/1939 | Jones | |
| 3,685,192 A | 8/1972 | Stibbard | |
| 4,464,857 A | 8/1984 | Olszewski | |
| 5,918,405 A * | 7/1999 | Marusak | A01K 85/16 43/42.09 |
| 5,946,848 A | 9/1999 | Ysteboe et al. | |
| 6,041,540 A | 3/2000 | Potts | |
| 6,647,660 B1 | 11/2003 | Kruger | |
| 8,181,382 B2 | 5/2012 | Pack | |
| 8,490,319 B2 * | 7/2013 | Mancini | A01K 85/00 43/42.09 |
| 2006/0260176 A1 | 11/2006 | Yeung | |
| 2008/0078114 A1 | 4/2008 | Pack | |
| 2010/0146837 A1 | 6/2010 | Zernov | |
| 2013/0036654 A1 * | 2/2013 | Goosey | A01K 85/01 43/42.31 |
| 2015/0208627 A1 * | 7/2015 | Coniglio | A01K 85/16 43/42.24 |
| 2016/0120159 A1 * | 5/2016 | Tsybulnyk | A01K 85/01 43/26.2 |

FOREIGN PATENT DOCUMENTS

| | | |
|---|---|---|
| CA | 2219705 | 4/1999 |
| GB | 2239151 | 6/1991 |

* cited by examiner

Primary Examiner — Richard G Davis
(74) Attorney, Agent, or Firm — Wells St. John P.S.

(57) ABSTRACT

Artificial fish for use as a fishing lure are provided that can include a body about a frame, the body defining fish attributes and the frame supporting the body and defining a recess configured to receive an end of a weighted rod. Other lures can include at least two frame components articulated in relation to one another. Methods for manufacturing an artificial fish for use as a fishing lure are provided. Methods for using an artificial fish lure are provided. Artificial fish for use as fishing lure kits are provided.

4 Claims, 5 Drawing Sheets

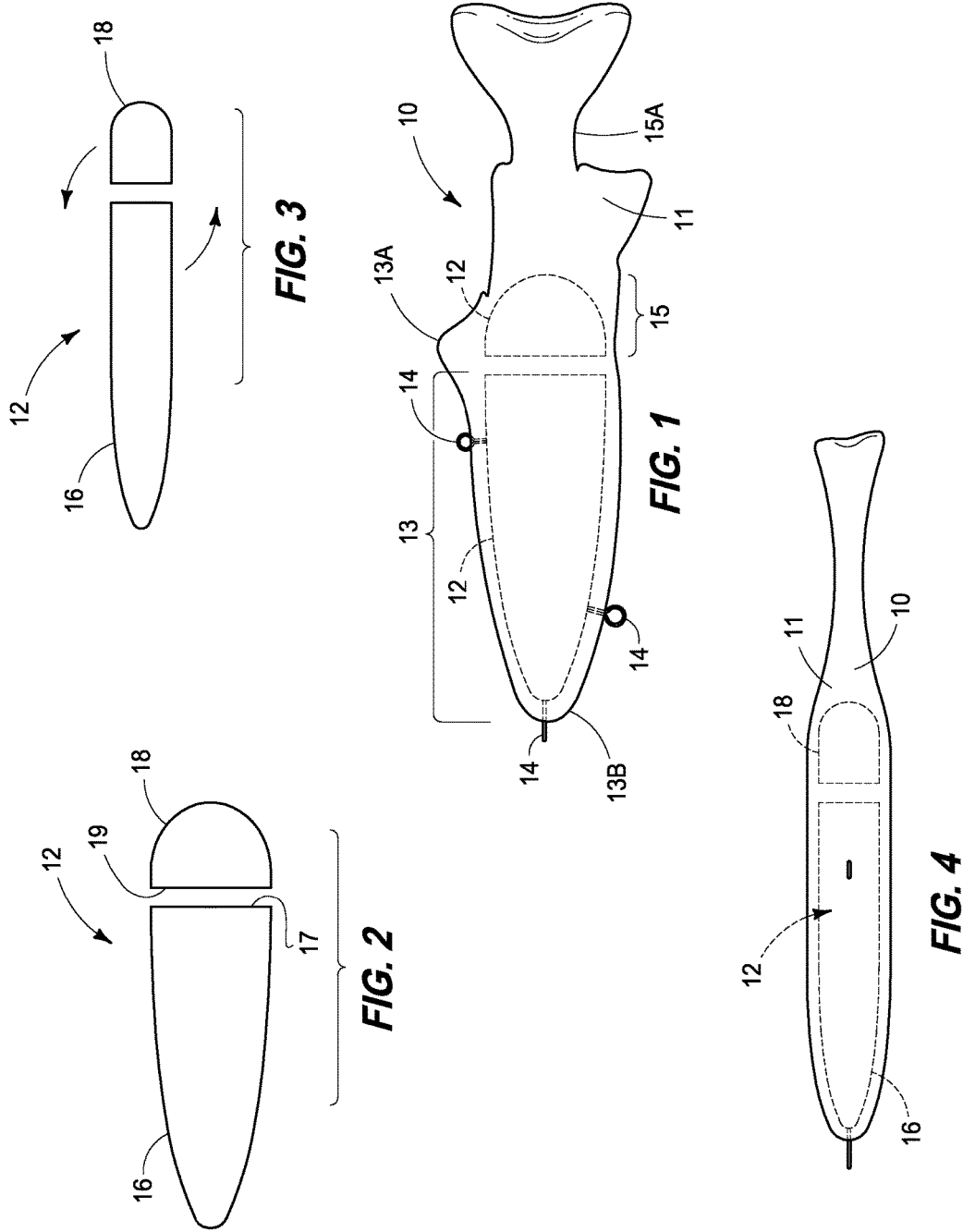

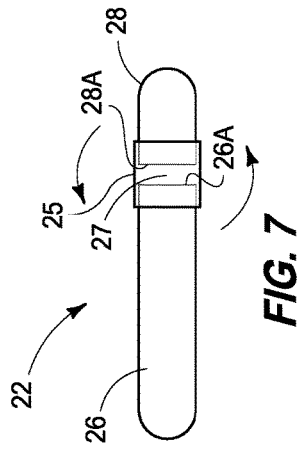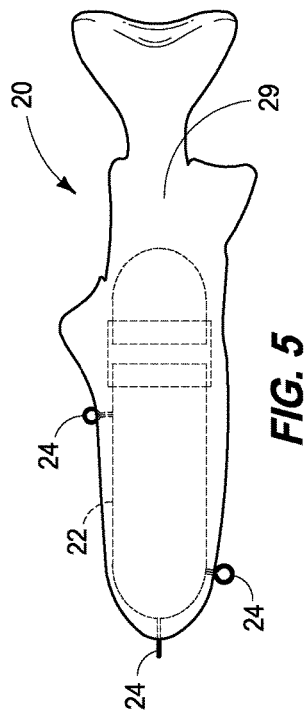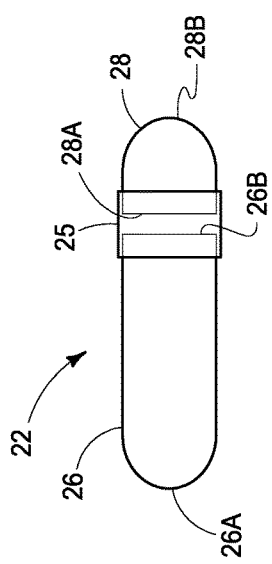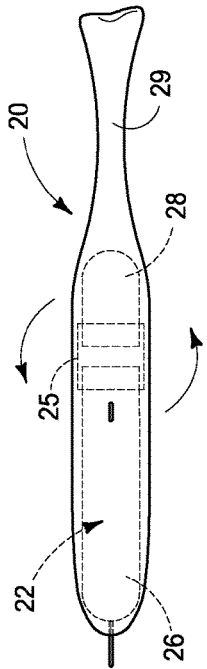

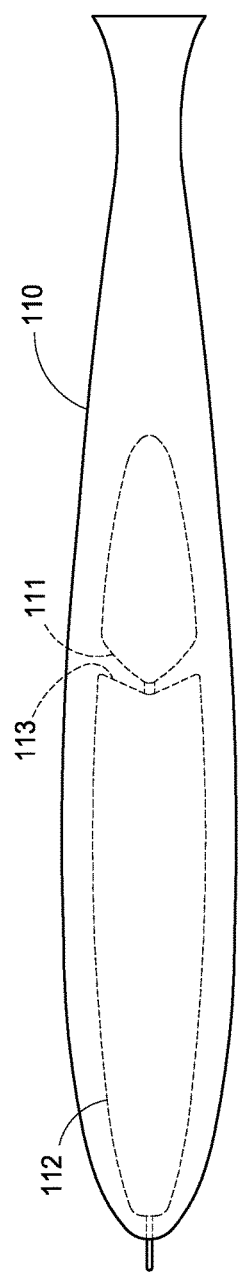
FIG. 11
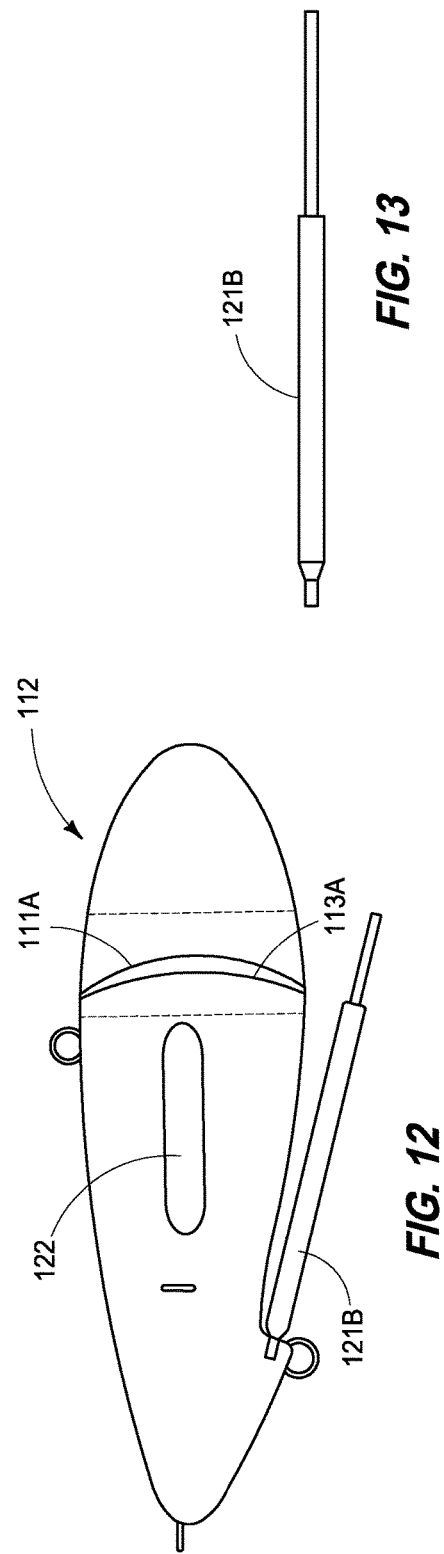
FIG. 12
FIG. 13

FISHING LURES AND FISHING LURE PRODUCTION METHODS AND USES

CROSS REFERENCE TO RELATED APPLICATION

This application claims priority to U.S. Provisional Patent Application Ser. No. 62/010,955 which was filed on Jun. 11, 2014, the entirety of which is incorporated by reference herein

TECHNICAL FIELD

The present disclosure relates to fishing lures and more specifically articulated fishing lures, manufacturing methods, and uses.

BACKGROUND

Fishing lures have become increasingly important in game fishing as well as industrial fishing. Current lures can be powered and/or articulated to simulate bait fish. This simulation can include weighting the lure properly and/or articulating the lure in certain portions to allow for the lure to simulate bait fish upon a dragging motion and/or sinking motion. The present disclosure provides fishing lures and fishing lure production methods and uses.

DRAWINGS

Embodiments of the disclosure are described below with reference to the following accompanying drawings.

FIG. 1 is a fishing lure having a frame therein.

FIG. 2 is a more detailed view of frame components within FIG. 1.

FIG. 3 is a top view of the frame component of FIG. 2.

FIG. 4 is a top view of the lure of FIG. 1.

FIG. 5 is a lure having a frame according to an embodiment of the disclosure.

FIG. 6 is a view of the frame of FIG. 5 according to an embodiment of the disclosure.

FIG. 7 is a top view of the frame of FIG. 6 according to an embodiment of the disclosure.

FIG. 8 is a top view of the lure of FIG. 5 according to an embodiment of the disclosure.

FIG. 11 is a top view of a lure according to an embodiment of the disclosure.

FIG. 12 is a view of a frame according to an embodiment of the disclosure.

FIG. 13 is a view of a weighted frame to be used in accordance with embodiments of the disclosure.

SUMMARY

Figure 9:
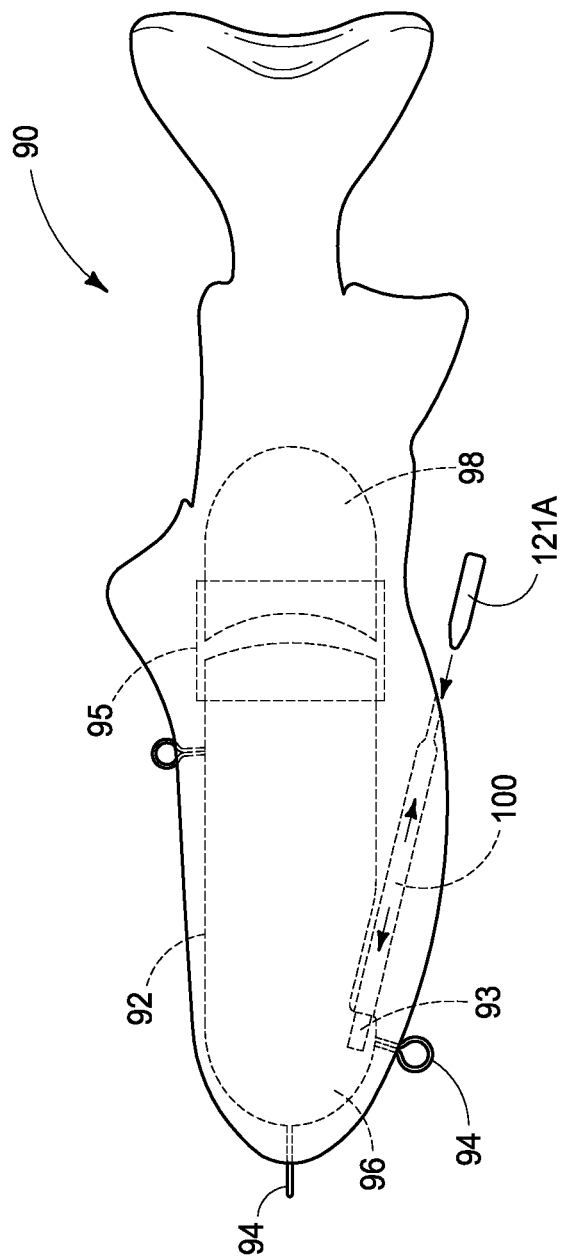
FIG. 9 is a view of a lure according to an embodiment of the disclosure.

Artificial fish for use as a fishing lure are provided that can include at least two frame components articulated in relation to one another, a first of the two components defining a first length of a first portion of the lure, the first portion of the lure extending from about a dorsal fin of the lure to a nose of the lure, a second of the two components defining a second length of a second portion of the lure, the second portion of the lure extending from about the dorsal fin of the lure to about a tail of the lure, the two components having complimentary ends defining an articulating joint between the two components. The lure also includes a body enveloping the frame components, the body defining the nose, dorsal fin and tail of the artificial fish.

Methods for manufacturing an artificial fish for use as a fishing lure are provided. The methods can include providing a first frame component having a first end extending to a second end; providing a second frame component having a third end extending to a fourth end, wherein the second end of the first frame component compliments the third end of the second frame component to allow for articulation between the two ends; coupling the second end of the first frame component to the third end of the second frame component, the coupling defining a space between the second and third ends of the components and enclosing that space; and molding a body about the frame components, the body enveloping the frame components without entering the space to define a head, dorsal fin, and tail of the artificial fish.

Artificial fish for use as a fishing lure are provided that can include a body about a frame, the body defining fish attributes and the frame supporting the body and defining a recess configured to receive an end of a weighted rod.

Methods for using an artificial fish lure are provided. The methods can include providing an artificial fish for use as a fishing lure, the lure having a recess configured to receive a weighted rod; providing a plurality of differently weighted rods; selecting a weighted rod from the plurality of weighted rods; coupling the weighted rod within the recess of the lure; and using the lure to attract fish.

Artificial fish for use as fishing lure kits are provided, the kits can include: a body about a frame, the body defining fish attributes and the frame supporting the body and defining a recess configured to receive an end of a weighted rod; and a plurality of weighted rods, each rod configured to couple with the recess of the frame.

DESCRIPTION

This disclosure is submitted in furtherance of the constitutional purposes of the U.S. Patent Laws "to promote the progress of science and useful arts" (Article 1, Section 8).

The fishing lures and processes of making same as well as uses of lures and lure kits will be described with reference to FIGS. 1-13. Referring to FIG. 1, an artificial fish for use as a fishing lure 10 is shown. Lure 10 can be configured as a fish and include a frame 12. The frame can be a hardened plastic and can include eyelets 14 extending therefrom.

Referring to FIG. 2, a side view of frame 12 is shown demonstrating at least two frame components of frame 12, components 16 and 18. As shown, component 16 is substantially larger than component 18, and is designed in this manner to be configured with smaller component 18 proximate a tail portion of lure 10, while the elongated and larger portion 16 is associated with the nose portion of lure 10. Frame component 16 can be considered the first of the two components and define a first length of a first portion 13 of lure 10. As shown, portion 13 can extend from about a dorsal fin 13A to a nose 13B of lure 10. Frame component 18 can be considered a second of the two components and define a second length of a second portion 15 of lure 10. As shown, portion 15 can extend from about dorsal fin 13A to about tail 15A of lure 10.

Components 16 and 18 can have complimentary ends 17 and 19. These ends can be configured to mate and/or abut one another. These ends can be beveled as shown in FIGS. 9-12. Accordingly, the first component can define a beveled recess 113 in one cross section and the complimentary end of the second component can define a beveled point 111 in the same cross section. Referring to FIG. 12, edges 113A and 111A of the components can be arcuate as well as complimentary.

Referring next to FIG. 3, a top view of frame 12 is shown with arrows demonstrating a desired rotational relationship between components 16 and 18, for example. About ends 17 and 19, the frame components can articulate and/or hinge. This configuration of the frame components can form an articulating joint. This articulation can emulate the swimming motion of a fish.

These frame components are typically cast within the lure 10 itself, wherein the outside or body component 11 of lure 10 is a soft polymer that can be used to emulate a bait fish, for example. In accordance with example implementations, the frame components can be constructed of a material substantially more rigid than the body. Body 11 can envelop frame components 16 and 18 and body 11 can define attributes of the fish such as the nose, dorsal fin, belly, anus and/or tail.

Referring next to FIG. 4, frame 12 is shown in a top view within lure 10. As can be seen, a lack of rotation is demonstrated between components 16 and 18 within lure 10. This has been demonstrated to arise from the molding process, wherein frame 12 is placed within a mold, and upon providing the remaining skin or body of lure 10, the rotational freedom between components 16 and 18 is diminished.

Referring next to FIG. 5, lure 20 is shown according to an embodiment of the disclosure that includes frame 22 therein, as well as eyelets 24 extending from frame 22. According to example implementations, and with reference to FIGS. 6-8, a side view of frame 22 is shown with components of frame 22 being components 26 and 28 arranged in relation to one another and having a space there between. In accordance with example methods, first frame component 26 can be provided having a first end 26A extending to a second end 26B. A second frame component 28 can be provided having a third end 28A extending to a fourth end 28B. The second end 26B can be complimentary to third end 28A to allow for articulation between the two ends.

Components 26 and 28 can be coupled together about second end 26A and third end 28A. The coupling can define space 27 between ends 26A and 28A. A tubular member 25 can be provided to couple ends 26A and 28A to form enclosed space 27. Tubular member 25 can be constructed of a material that is more flexible than the frame components and/or less flexible than the material of the body. This tubular member can be referred to as a band or cover. This band or cover 25 can be manufactured of a more pliable material such as the material that will eventually be used as coating or the cover of bait lure 20. Referring next to FIG. 7, a top view of frame 22 is shown demonstrating the rotational relationship between components 26 and 28 having member 25 connecting these components.

Referring next to FIG. 8, lure 20 is shown in a top view with frame therein, and a rotational relationship being maintained between components 26 and 28 by member 25. This stage of processing can take place after body 29 is molded about the frame components. Body 29 can envelop the frame components without entering space 27 and define attributes of a fish. In this configuration, the molding process does not inhibit the rotational relationship between these components, as member 25 maintains the rotational integrity of these components upon molding.

Referring next to FIG. 9, a lure 90 is shown that includes a frame 92 that includes components 96 and 98 connected via member 95. According to this implementation, the rotational relationship between components 96 and 98 can be maintained, allowing for the lure to emulate a bait fish swimming movement upon drag or drop usage. In accordance with example implementations, eyelets 94 can extend from frame 92, and a weight that can influence the glide or float of lure 90 is shown as weight 121A.

This weight can be an adjustable weight, and can extend through the lower portion of the lure 90 and up into and couple with frame 92, for example, and in particular embodiments, portion 96 of frame 92. Accordingly, lure 90, for example, can include a body about a frame with the body defining fish attributes and the frame supporting the body and defining a recess 93 configured to receive an end of weight 121A or 121B. Weight 121A or 121B can be configured as a weighted rod. Weight 121A or 121B can be provided as one or a plurality. Each of the plurality can be of a different weight. The plurality of weights and/or one or more body on frame lures can form a lure kit.

According to example implementations, frame component 96 can define a perimeter, part of which can be operatively aligned and/or associated with the belly of the fish as shown in FIG. 9 for example. Methods for manufacturing these lures can include operatively engaging a weight within the recess prior to enveloping the frame components with the body material during the body on frame molding process. This method can provide channel 120 as shown in FIG. 10.

Figure 10:
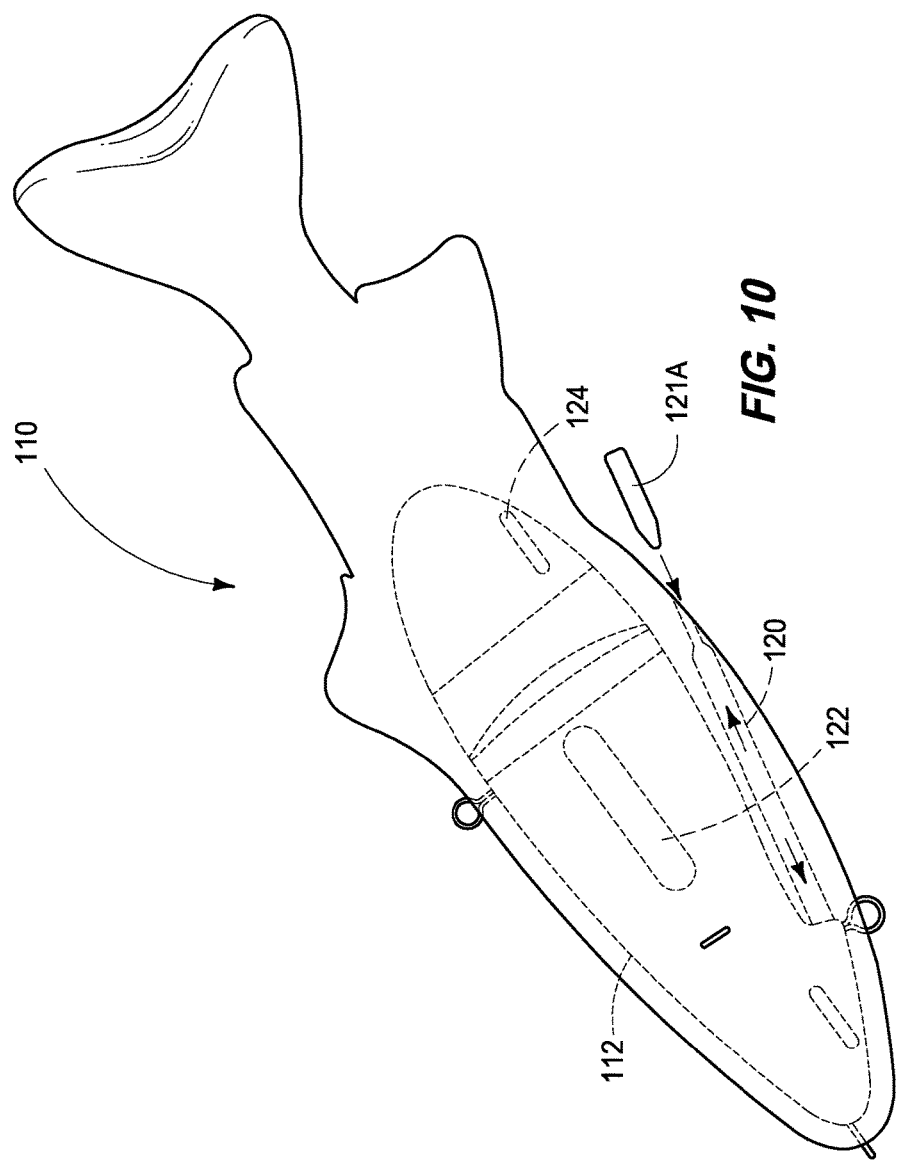
FIG. 10 is a view of a lure according to an embodiment of the disclosure.

Referring to FIG. 10, frame component 112 can include an opening 122 extending through the frame component. The body material of the lure can fill opening 122. Opening 122 can be used during fishing for additional lure attachments, such as for example, additional fishing lines. In accordance with example implementations, the openings may also include opening 124, which may be utilized for the same purpose.

Referring next to FIGS. 10-13, another embodiment of the lure shown as 110 is depicted. In this configuration, frame 112 is within a lure body that can be molded as desired to emulate texture and visually emulate a bait fish. Referring to FIGS. 11-13, one of a plurality of weighted rods can be provided into channel 120 and couple with frame component 112 along an axis of the belly of the fish. Channel 120 can be substantially parallel with the axis of the belly of the fish and have one opening in the belly of the fish proximate the anus of the fish.

In accordance with example implementations, weight 121A or 121B can come in a plurality of weights that may be utilized by the angler to emulate different drops or flows of 110 as it is being used as a lure. For example, weights can range in size from ⅛ ounce to 1½ ounces, and may be change in and out as the angler desires. In accordance with example implementations, a lure having a recess to receive a weighted rod can be provided along with a plurality of weighted rods to form a kit. A weighted rod 121B can be selected by the angler and the weighted rod can be extended through channel 120 and into recess 93 to couple with the frame component. The lure can then be used by the angler to attract fish. Rod 121B can be removed and/or exchanged with another rod as desired.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. An artificial fish for use as a fishing lure comprising a body about a frame, the body defining fish attributes and the frame supporting the body and defining a recess configured to receive an end of a weighted rod, wherein at least one fish attribute is a belly of a fish, the recess being accessible from the belly of the fish.

2. The artificial fish for use as a fishing lure of claim 1 wherein the recess extends along an axis that is substantially parallel with an axis of the belly of the fish.

3. The artificial fish for use as a fishing lure of claim 1 wherein the body of the fish defines a channel in line with the recess and configured to receive the weighted rod.

4. The artificial fish for use as a fishing lure of claim 1 wherein another fish attribute is an anus of the fish, the body of the fish defining a channel extending between the anus of the fish and the recess of the body.

* * * * *